United States Patent
Kim et al.

(10) Patent No.: US 6,788,473 B2
(45) Date of Patent: Sep. 7, 2004

(54) OBJECTIVE LENS DEVICE FOR CORRECTING CHROMATIC ABERRATION AND OPTICAL PICKUP EMPLOYING THE SAME

(75) Inventors: Tae-kyung Kim, Seoul (KR); Young-man Ahn, Gyeonggi-do (KR); Hea-jung Suh, Gyeonggi-do (KR); Chong-sam Chung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 09/987,426

(22) Filed: Nov. 14, 2001

(65) Prior Publication Data

US 2002/0105735 A1 Aug. 8, 2002

Related U.S. Application Data

(60) Provisional application No. 60/251,568, filed on Dec. 7, 2000.

(30) Foreign Application Priority Data

Dec. 7, 2000 (KR) .......................... 2000-74312

(51) Int. Cl.$^7$ .......................... G02B 21/02; G02B 9/12; G11B 7/135
(52) U.S. Cl. .................. 359/661; 359/784; 369/112.26
(58) Field of Search ................. 359/656–661, 359/784; 369/112.24, 112.26

(56) References Cited

U.S. PATENT DOCUMENTS

| | | | | |
|---|---|---|---|---|
| 3,912,379 A | * | 10/1975 | Dejager ...................... 359/789 |
| 4,927,247 A | * | 5/1990 | Tanaka et al. ............... 359/708 |
| 5,491,587 A | * | 2/1996 | Iwaki et al. ................. 359/641 |
| 5,644,437 A | * | 7/1997 | Maruyama et al. ......... 359/793 |
| 5,668,669 A | * | 9/1997 | Ohtake et al. .............. 359/684 |
| 6,570,827 B1 | * | 5/2003 | Yamamoto et al. ....... 369/44.14 |

FOREIGN PATENT DOCUMENTS

| | | |
|---|---|---|
| CN | 1210334 A | 3/1999 |
| JP | 61-259212 | 11/1986 |
| JP | 61-275808 | 12/1986 |
| JP | 62-35311 | 2/1987 |
| JP | 63-10118 | 1/1988 |
| JP | 3-134606 | 6/1991 |
| JP | 6-215409 | 8/1994 |
| JP | 8-234099 | 9/1996 |
| JP | 9-318873 | 12/1997 |
| JP | 2000-19388 | 1/2000 |
| JP | 2001-337269 | 12/2001 |
| JP | 2002-82280 | 3/2002 |

* cited by examiner

*Primary Examiner*—Georgia Epps
*Assistant Examiner*—William Choi
(74) *Attorney, Agent, or Firm*—Staas & Halsey LLP

(57) ABSTRACT

An objective lens device and an optical pickup employing the objective lens device. The objective lens device is formed of three lenses including a lens having a negative power and formed of material having an Abbe number which is 45 or less in line d. At least one surface of surfaces of the three lenses is formed to be aspherical. Thus, in the objective lens device, a high numerical aperture of 0.70 or more is realized and chromatic aberration is corrected with respect to blue light enabling improved recording and/or reproduction using blue light.

24 Claims, 8 Drawing Sheets

OBJECTIVE LENS DEVICE FOR CORRECTING CHROMATIC ABERRATION AND OPTICAL PICKUP EMPLOYING THE SAME

CROSS REFERENCE TO RELATED APPLICATIONS

This application claims the benefit of U.S. Provisional Application No. 60/251,568 filed Dec. 7, 2000 and Korean Patent Application No. 2000-74312 filed Dec. 7, 2000 in the Korean Patent Office, the disclosures of which are incorporated herein by reference.

BACKGROUND OF THE INVENTION

1. Field of the Invention

The present invention is related to an objective lens device having a high numerical aperture, and more particularly, to an objective lens device for correcting chromatic aberration due to a change in wavelength of light and/or an increase in line width of the wavelength of light emitted from a light source while having a high numerical aperture to realize high-density light concentration, and to an optical pickup employing the same.

2. Description of the Related Art

Recording capacity of an optical recording/reproducing apparatus is determined by a size of a light spot formed on an optical disc by an objective lens. The size (S) of the light spot is proportional to a wavelength λ and inversely proportional to a numerical aperture (NA) of the objective lens.

Thus, an optical pickup device for a next generation DVD (a so-called HD-DVD), (hereinafter, a high-density optical pickup device) which is presently being developed, may adopt a light source for emitting blue light and an objective lens having an NA greater than 0.6 to obtain a recording density higher than an information recording density obtained from a conventional CD or DVD based optical disc by reducing the size of the light spot formed on the optical disc.

Optical materials, such as for example glass and plastic, which are used as material of the objective lens exhibit a sharp change in refractive index in a range of a wavelength shorter than 650 nm, as shown in Table 1.

TABLE 1

| Change in wavelength | Change in refractive index of M-BaCD5N glass by Hoya company |
|---|---|
| 650 nm → 651 nm | 0.000038 |
| 405 nm → 406 nm | 0.000154 |

As can be seen from Table 1, where the wavelength changes about 1 nm, optical material exhibits a four times greater change in refractive index in a blue wavelength range, for example, 405 nm, than in a 650 nm wavelength which is used for an optical pickup device for a DVD, The above sharp change in refractive index in the optical material with respect to the blue light is one of the major causes of deterioration in performance according to defocus in a recordable high-density optical recording/reproducing apparatus which records and reproduces repeatedly by using a blue wavelength light source.

That is, in the recordable optical recording/reproducing apparatus, optical power for recording and optical power for reproduction which are different from each other are used. A change in wavelength according to a change in optical output power during recording/reproduction is, for example, between 0.5–1 nm with respect to a blue light source. Usually, if output of a light source is increased, the wavelength of light emitted from the light source becomes longer. Thus, in the case of a high-density optical pickup device adopting a blue light source, a great amount of chromatic aberration, due to a change in wavelength in switching optical output between recording and reproduction in an objective lens designed with respect to a reference wavelength, is generated so that defocus is generated.

For example, as can be seen from FIGS. 1 through 3, an objective lens device having a 0.65 NA which is designed with respect to a 405 nm wavelength exhibits great wavefront aberration and defocus with respect to a tiny change of about 1 nm in wavelength. FIG. 1 is a graph showing light spot strength formed on an optical disc according to defocus due to a change in optical output power during recording/reproduction. FIGS. 2 and 3 are graphs showing amounts of wavefront aberration (optical path difference: OPD) and defocus of an objective lens device having a 0.65 NA according to a change of wavelength, respectively.

Although the defocus due to a change in wavelength is correctable by adjusting the objective lens device, since tracking a wavelength change by driving the objective lens device by an actuator takes a relatively long time, the quality of reproduction and recording signals deteriorates during the period of driving the objective lens. Defocus during an increase in output for recording causes a lack of recording optical power while defocus during a decrease in output for reproduction increases jitter.

That is, where the output of a light source is increased to record information on an optical disc, the wavelength of light emitted from the light source is lengthened to, for example, 406 nm, so that defocus is generated to a light spot formed on the optical disc. Thus, until the actuator tracks the defocus, recording is not performed properly. Where the output of a light source is decreased for reproduction, the wavelength of the light source is shortened to, for example, 405 nm. In this case, since the actuator is in the state of tracking suitable for the lengthened wavelength, defocus is generated again. Due to the defocus, jitter increases in a reproduction signal.

Also, where the light source is driven with a high frequency (HF) to reduce feed-back noise of a light source due to light returning to the light source from the optical disc, a line width of a wavelength of the light source increases to, for example, about 1 nm, and resulting chromatic aberration deteriorates a reproduction signal.

Thus, a rewritable high-density optical pickup device needs to have an optical system which restricts or compensates for generation of chromatic aberration even where the wavelength of the light emitted from the light source changes according to a change in recording and reproduction output.

A conventional objective lens device having two lenses having a function to correct chromatic aberration has been suggested in Japanese Patent Publication No. 10-123410. Referring to FIG. 4, the conventional objective lens device includes first and second lenses 1 and 4 formed of low dispersive glass having an Abbe number which is greater than 40. At least one surface of the first and second lenses 1 and 4 is formed to be aspherical, so that correction of chromatic aberration and a high NA are realized with respect to light having a 635 nm wavelength. The chromatic aberration is corrected by the first lens 1 provided between a disc 6 and the second lens 4 for concentrating light and the objective lens device has an NA greater than 0.7. A diaphragm 2 restricts a light input area.

However, since the conventional objective lens device is formed of two lenses in two groups and uses low dispersive glass having an Abbe number which is greater than 40, the correction of chromatic aberration and a high NA is realized with respect to light having a 635 nm wavelength. However, the conventional objective lens device does not realize the correction of chromatic aberration and a high NA with respect to blue light.

SUMMARY OF THE INVENTION

To solve the above problems, it is an object of the present invention to provide an objective lens device which corrects chromatic aberration with respect to a blue light and realizes a high numerical aperture, and an optical pickup employing the same.

Additional objects and advantages of the invention will be set forth in part in the description which follows, and, in part, will be obvious from the description, or may be learned by practice of the invention.

Accordingly, to achieve the above and other objects of the invention, there is provided an objective lens device comprising three lenses including a lens having a negative power and formed of material having an Abbe number which is 45 or less in line d, wherein at least one surface of the three lenses is aspherical. Preferably, at least one of the three lenses has a positive power and the lens having the negative power is combined with a lens having a positive power to be a doublet so that a structure of three lenses in two groups is formed.

Preferably, the three lenses are a first lens having a positive power, a second lens having a negative power, and a third lens having a positive power, arranged sequentially from a direction from which light is input. Preferably, given that a focal length of the lens having the negative power is $fn$ and an overall focal length of the objective lens device is $f$, the objective lens device satisfies an equation of $$-2.4 < \frac{fn}{f} < -1.4.$$

To achieve the above and other objects of the invention, there is provided an optical pickup comprising a light source which generates and emits light, an objective lens device which focuses the light emitted from the light source into a light spot formed on a recording medium, an optical path changer, arranged on an optical path between the light source and the objective lens device, which changes a proceeding path of incident light, and a photodetector which receives light reflected by the recording medium, wherein the objective lens device comprises three lenses wherein one of the three lenses has a negative power and formed of material having an Abbe number which is 45 or less in line d, and at least one surface of surfaces of the three lenses is aspherical.

Preferably, the light source emits light having a wavelength in a range including 400 and 420 nm and the objective lens device has a numerical aperture which is 0.70 or greater.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Figure 1:
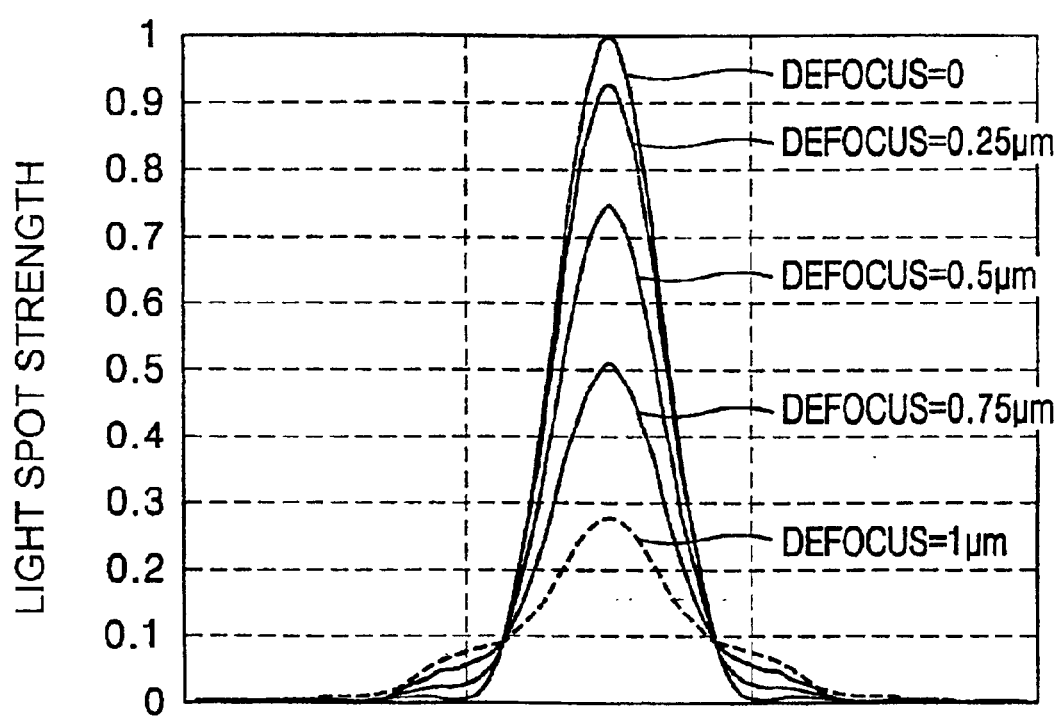
FIG. 1 is a graph showing light spot strength formed on a recording medium according to defocus due to a change in optical output power during recording/reproduction.
Figure 2:
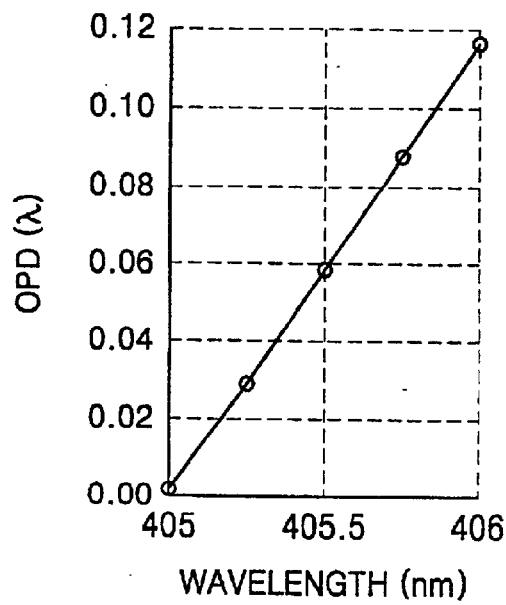
FIGS. 2 and 3 are graphs showing amounts of wavefront aberration and defocus, respectively, of an objective lens device having a 0.65 NA according to a change of wavelength.
Figure 3:
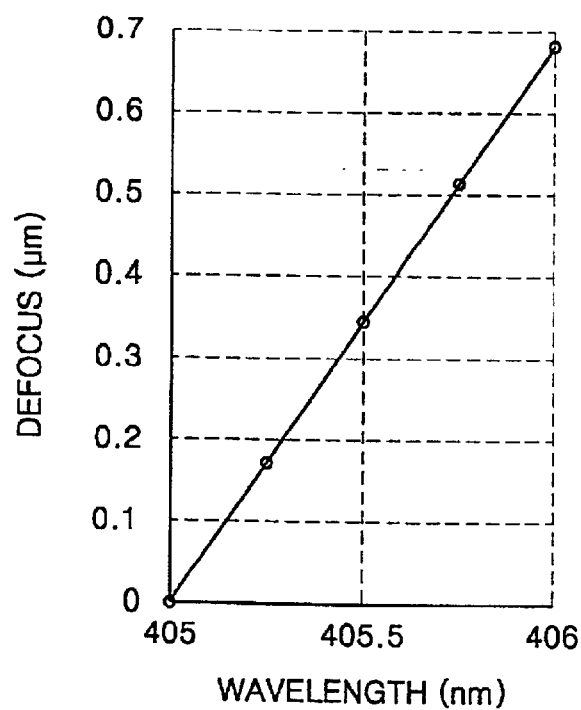
Figure 4:
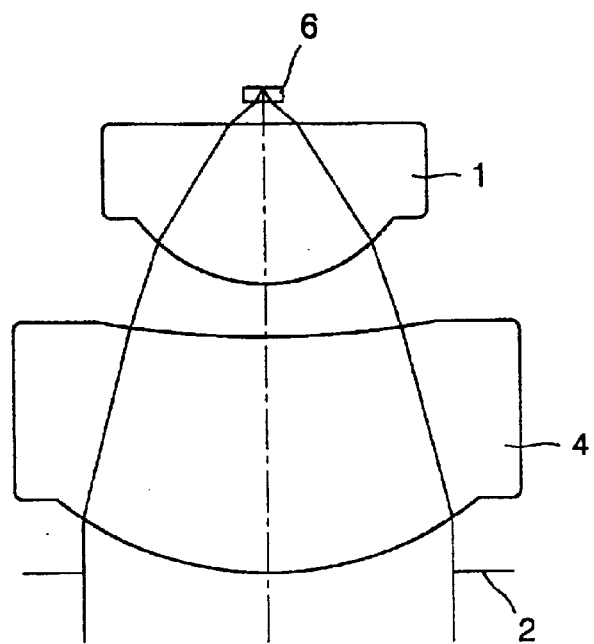
FIG. 4 is a view showing an example of a conventional objective lens device.

Reference will now be made in detail to the present embodiments of the present invention, examples of which are illustrated in the accompanying drawings, wherein like reference numerals refer to like elements throughout.

Figure 5:
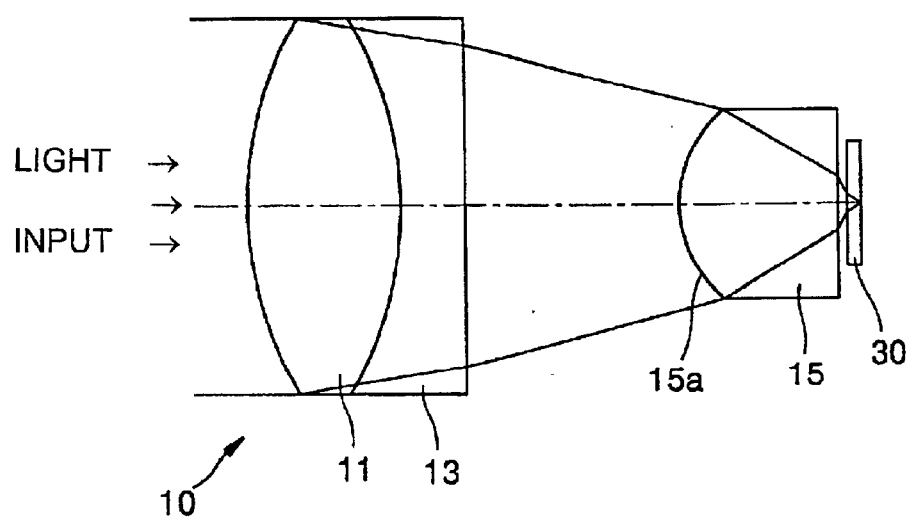
FIG. 5 is a view schematically showing an objective lens device according to an embodiment of the present invention.

Referring to FIG. 5, an objective lens device 10 according to the present invention is formed of first, second and third lenses 11, 13 and 15, where the first second and third lenses 11, 13 and 15 are arranged sequentially from the side where light is input. At least one of the first, second and third lenses 11, 13 and 15 is formed of a glass or a plastic material having an Abbe number which is 45 or less, preferably, 35 or less, in line d and has a negative power. ("Line d" represents the wavelength of a helium line, i.e. 587.56 nm.) At least one surface of the first, second and third lenses 11, 13 and 15, for example, a surface 15a of the third lens 15, is formed as an aspherical surface.

Also, for example, assuming that the second lens 13 has a negative power and that the focal distance of the second lens 13 is $fn$, and an overall focal distance of the objective lens device 10 is $f$, the objective lens device 10 is constructed to satisfy the following Equation 1.

$$-2.4 < \frac{fn}{f} < -1.4 \qquad \{\text{Equation 1}\}$$

As shown in FIG. 5, the objective lens device 10 of the present invention is formed of three lenses arranged in two units. The first lens 11 and the third lens 15 have a positive power and the second lens 13 has a negative power. The first lens 11 and the second lens 13 are combined to form a doublet structure. Here, reference numeral 30 denotes, for example, a recording medium of a next generation DVD series.

The objective lens device 10 realizes a high numerical aperture of 0.70 or more and corrects chromatic aberration in a blue wavelength range as can be seen from actual optical design examples which are described below.

Figure 6:
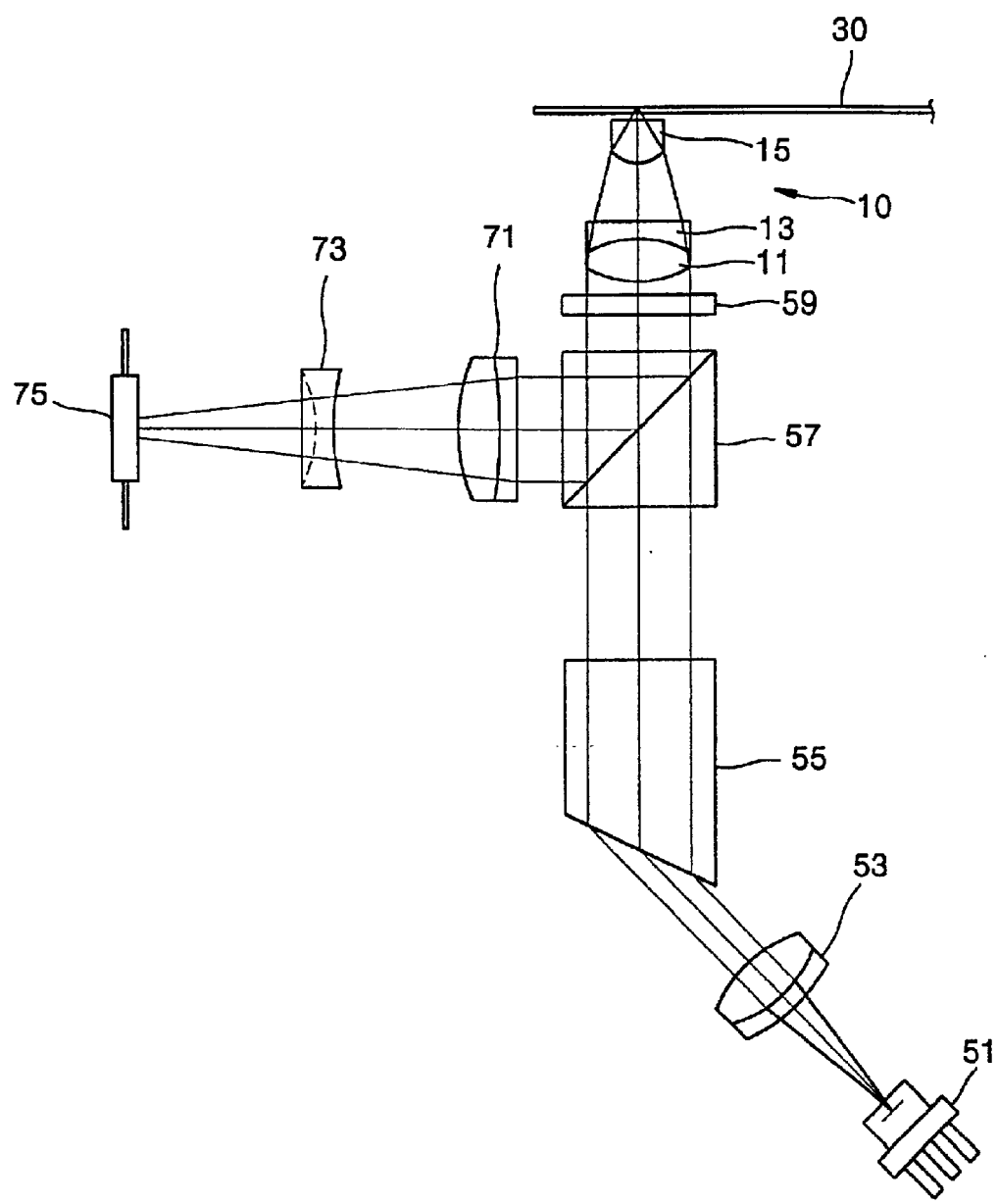
FIG. 6 is a view schematically showing an optical pickup employing the objective lens device shown in FIG. 5.

FIG. 6 shows an optical pickup employing the objective lens device 10 according to the present invention. Referring to FIG. 6, the optical pickup shown in FIG. 6 comprises a light source 51, an optical path changer which changes a proceeding path of an incident light, an objective lens device 10 which forms a light spot on a recording medium 30 by focusing light emitted from a light source 51, and a photodetector 75 which receives light which is reflected by the recording medium 30 and which passes through the optical path changer.

The light source 51 comprises a semiconductor laser which emits blue light having a wavelength in a range including 400 nm and 420 nm, preferably, about 405 nm. The semiconductor laser is one of an edge emitting laser and a vertical cavity surface emitting laser.

The optical path changer is arranged on an optical path between the light source 51 and the objective lens device 10 and changes a proceeding path of incident light. The optical path changer preferably includes a polarizing beam splitter 57 which selectively transmits or reflects incident light according to polarization, and a ¼ wave plate 59 which changes a phase of the incident light. Here, a beam splitter (not shown) which transmits and reflects incident light in a predetermined ratio may be included as the optical path changer.

The objective lens device 10 shown in FIG. 6 has the structure as shown in FIG. 5 and has a numerical aperture of 0.7 or more, preferably, 0.85, so that a light spot is formed for recording/reproduction of a high-density recording medium 30 such as a recording medium of a next generation DVD series. Such a recording medium has a thickness of 0.1 mm.

The photodetector 75 receives light reflected by the recording medium 30 and detects an information signal and an error signal from the reflected light. Preferably, a collimating lens 53 is further provided on the optical path between the light source 51 and the optical path changer. The collimating lens 53 focuses divergent light emitted from the light source 51 to make the light a parallel beam. As shown in FIG. 6, where the collimating lens 53 is arranged on the optical path between the light source 51 and the optical path changer, a condensing lens 71 is further provided between the optical path changer and the photodetector 75.

Where an edge emitting laser is adopted as the light source 51, a beam shaping prism 55 is further provided on the optical path between the collimating lens 53 and the optical path changer so that information is recordable at a relatively low output. The beam shaping prism 55 shapes an oval beam emitted from the edge emitting laser into a circular beam. Where the edge emitting laser is used as the light source 51, the beam shaping prism 55 is disposed between the light source 51 and the collimating lens 53. Where a vertical cavity surface emitting laser which emits an almost circular beam is adopted as the light source 51, the beam shaping prism 55 is not used in the optical system of FIG. 6 and light source 51 is appropriately relocated.

Reference numeral 73 denotes a sensing lens. Where a focus error signal is detected by an astigmatism method, for example, an astigmatism lens may be used as the sensing lens 73 to cause astigmatism to incident light.

Since the optical pickup of the present invention includes the objective lens device 10 which realizes a high numerical aperture with respect to blue light and which corrects chromatic aberration, information is recordable on and is reproducible from a recording medium of a next generation DVD series.

Chromatic aberration, generated due to a change in wavelength of light emitted from the light source 51 according to a change in the output of light during a switching of a reproduction mode and recording mode, and an increase in line width, due to the light source 51 being driven by high frequency (HF), are corrected by the objective lens device 10. Thus, the optical pickup according to the present invention employing the objective lens device 10 and a blue light source are operable to perform recording and/or reproduction with respect to a recording medium of a next generation DVD series.

Here, FIG. 6 shows one example of an optical pickup device employing the objective lens device 10 according to the present invention. However, the optical pickup device according to the present invention is not limited to use in the exemplary optical configuration of FIG. 6.

In order to confirm the effect of chromatic aberration with respect to blue light of the objective lens device 10 according to the present invention, first through fourth optical design examples of the objective lens device 10 according to the present invention are described below. In the first, second, third, and fourth optical design examples as described with respect to FIGS. 7, 9, 11 and 13, respectively, the objective lens device 10 is formed of the first lens 11 having a positive power, the second lens 13 having a negative power, and the third lens 15 having a positive power. The surfaces S14, S24, S34, S44 in FIGS. 7, 9, 11 and 13, respectively, of the third lens 15 on which light is incident are formed to be aspherical. Reference wavelength is 405 nm and the overall focus length is 1.765 mm with respect to the recording medium 30 having a thickness of 0.1 mm. Also, a parallel light beam having a diameter of entrance pupil of 3.0 mm is input and a numerical aperture is 0.70 or greater.

Figure 7:
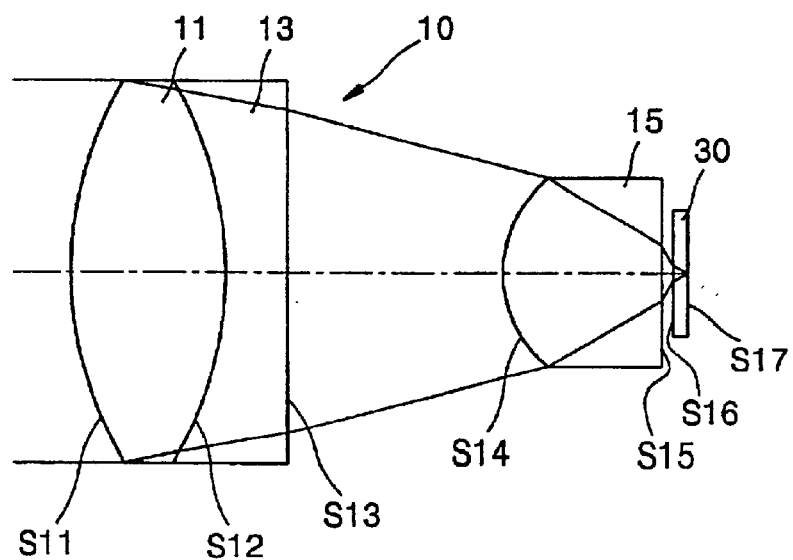
FIG. 7 is a view showing a structure of an objective lens device according to a first optical design of the present invention, optical data of which is shown in Table 2.
Figure 8:
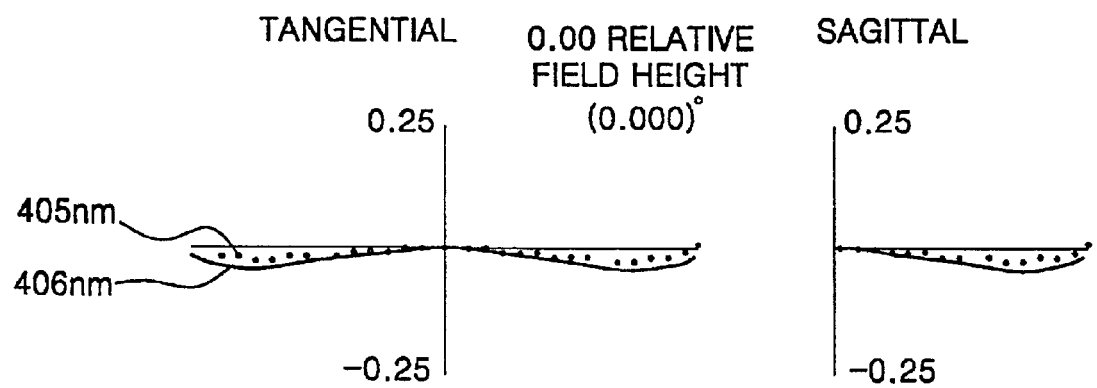
FIG. 8 is a view showing aberration of the objective lens device of FIG. 7.
Figure 9:
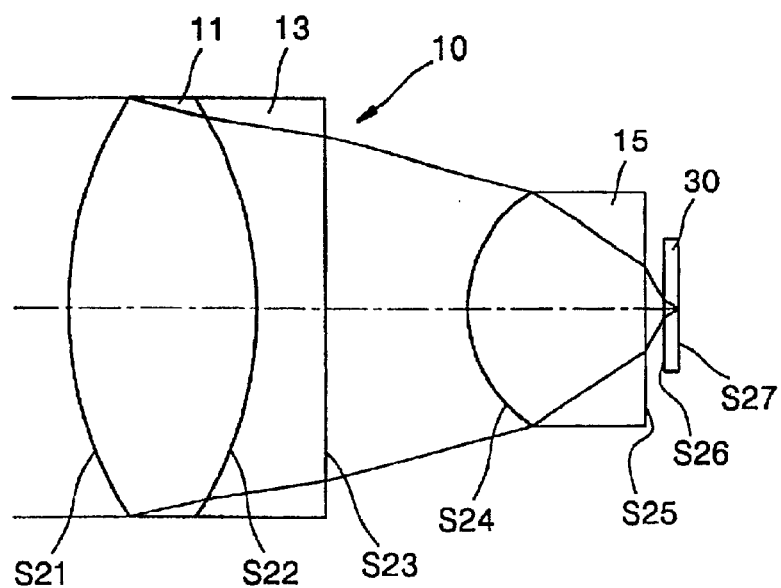
FIG. 9 is a view showing a structure of the objective lens device according to a second optical design of the present invention, optical data of which is shown in Table 3.
Figure 10:
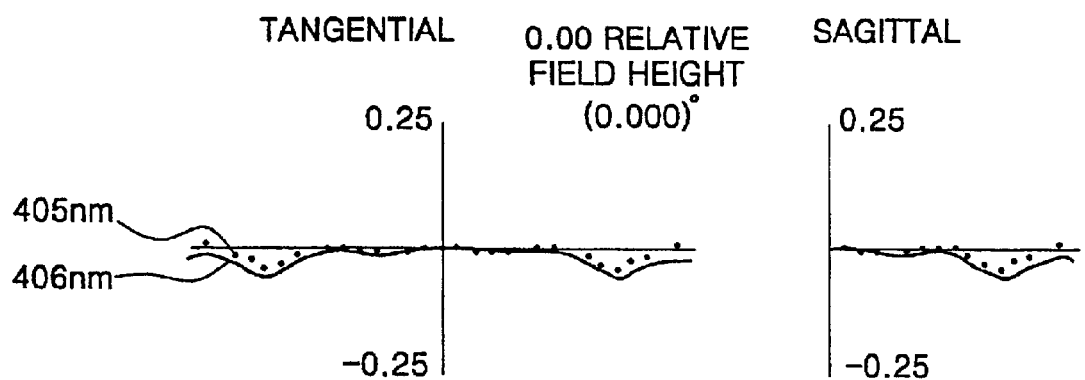
FIG. 10 is a view showing aberration of the objective lens device of FIG. 9.
Figure 11:
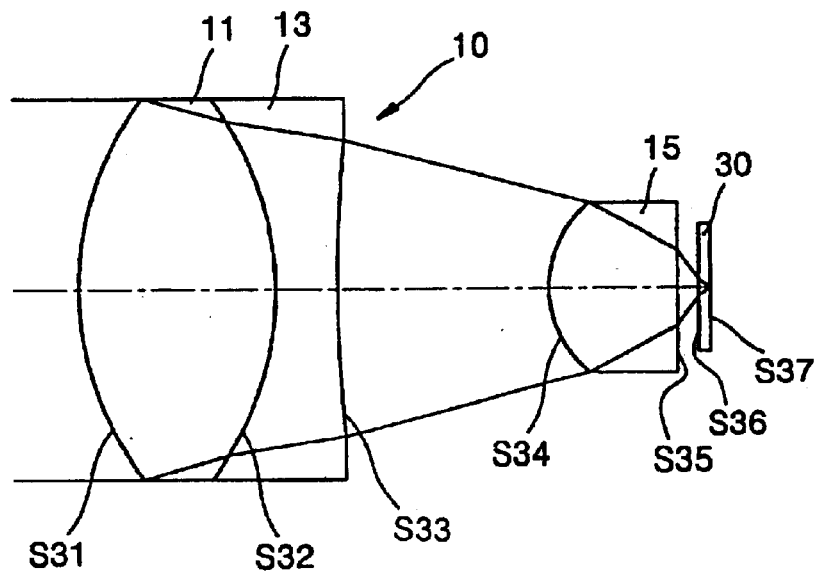
FIG. 11 is a view showing a structure of the objective lens device according to a third optical design of the present invention, optical data of which is shown in Table 4.
Figure 12:
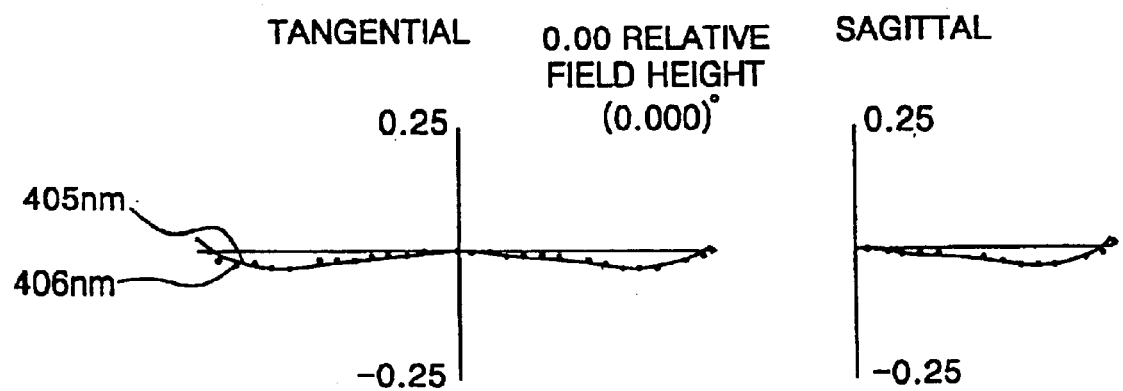
FIG. 12 is a view showing aberration of the objective lens device of FIG. 11.

Table 2 and FIG. 7 show the first optical design example of the objective lens device 10 according to the present invention. FIG. 8 shows aberration of the objective lens device 10 having optical data as shown in Table 2. Table 3 and FIG. 9 show the second optical design example of the objective lens device 10 according to the present invention. FIG. 10 shows aberration of the objective lens device 10 having optical data as shown in Table 3. Table 4 and FIG. 11 show the third optical design example of the objective lens device 10 according to the present invention. FIG. 12 shows aberration of the objective lens device 10 having optical data of Table 4.

TABLE 2

| Surface | Radius of curvature (mm) | Thickness/ Interval (mm) | Material (glass) | Refractive index | Abbe number in line d |
|---|---|---|---|---|---|
| S11 | 3.003070 | 1.2000000 | E-BaF8__HOYA | 1.646734 | 47.1 |
| S12 | −3.003070 | 0.500000 | E-FD4__HOYA | 1.806295 | 27.5 |
| S13 | ∞ | 1.707467 | | | |
| S14 (aspherical surface) | 0.911822 | 1.250000 | M-Lac130__HOYA | 1.715566 | 53.2 |
| K: −0.699640 A: 0.917676E−01 B: 0.462801E−01 C: 0.317180E−01 D: 0.114090E+00 E: −.182547E+00 F:−.198125E−09 G: −.406463E−10 | | | | | |
| S15 | ∞ | 0.100000 | | | |
| S16 | ∞ | 0.100000 | 'CG' | 1.621462 | 31.0 |
| S17 | ∞ | 0.000000 | | | |

TABLE 3

| Surface | Radius of curvature (mm) | Thickness/ Interval (mm) | Material (glass) | Refractive index | Abbe number in line d |
|---|---|---|---|---|---|
| S21 | 2.823244 | 1.3500000 | E-BaF8__HOYA | 1.646734 | 47.1 |
| S22 | −2.798572 | 0.500000 | E-FD4__HOYA | 1.806295 | 27.5 |
| S23 | 148.526158 | 1.020972 | | | |
| S24 (aspherical surface) | 0.903599 | 1.300000 | M-BaCD5N__HOYA | 1.605183 | 61.3 |
| K: −0.596430 A: 0.807580E−01 B: −.827319E−02 C: 0.165423E+00 D: −.912224E−01 | | | | | |
| S25 | ∞ | 0.150000 | | | |
| S26 | ∞ | 0.100000 | 'CG' | 1.621462 | 31.0 |
| S27 | ∞ | 0.000000 | | | |

TABLE 4

| Surface | Radius of curvature (mm) | Thickness/ Interval (mm) | Material (glass) | Refractive index | Abbe number in line d |
|---|---|---|---|---|---|
| S31 | 2.591625 | 1.5000000 | E-BaF8__HOYA | 1.646734 | 47.1 |
| S32 | −2.636949 | 0.500000 | E-FD4__HOYA | 1.806295 | 27.5 |
| S33 | 13.932416 | 1.649604 | | | |
| S34 (aspherical surface) | 0.795351 | 1.000000 | M-Lac130__HOYA | 1.715566 | 53.2 |
| K: −0.350912 A: 0.333620E−01 B: −.767010E−01 C: 0.337696E+00 D: −.546842E+00 | | | | | |
| S35 | ∞ | 0.150000 | | | |
| S36 | ∞ | 0.100000 | 'CG' | 1.621462 | 31.0 |
| S37 | ∞ | 0.000000 | | | |

As shown in Tables 2 through 4, in the first through third optical design examples of the objective lens device 10 according to the present invention, each of the second lenses 13 having a negative power is formed of glass having an Abbe number which is 27.5. The focal distances of the second lenses 13 of the examples shown in FIGS. 7, 9 and 11 are designed to be −3.725 mm, −3.402 mm and −2.713 mm, respectively.

As can be seen from FIGS. 8, 10 and 12 showing aberration of the objective lens device 10 having the optical data of Tables 2, 3 and 4, respectively, minimal aberration is generated to the objective lens device 10 even where the wavelength of light emitted from the light source 51 changes from the reference wavelength of 405 nm to 406 nm. In FIGS. 8, 10, 12 and 14, relative field means the normalization of the maximum design value of a lens and 0.00 relative field height means that light parallel to the optical axis is incident on the objective lens.

Figure 13:
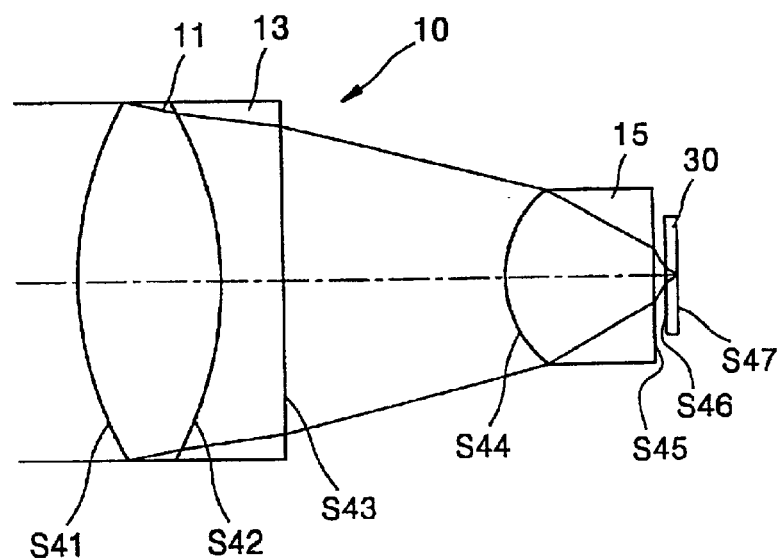
FIG. 13 is a view showing the structure of the objective lens device according to a fourth optical design of the present invention, optical data of which is shown in Table 5.
Figure 14:
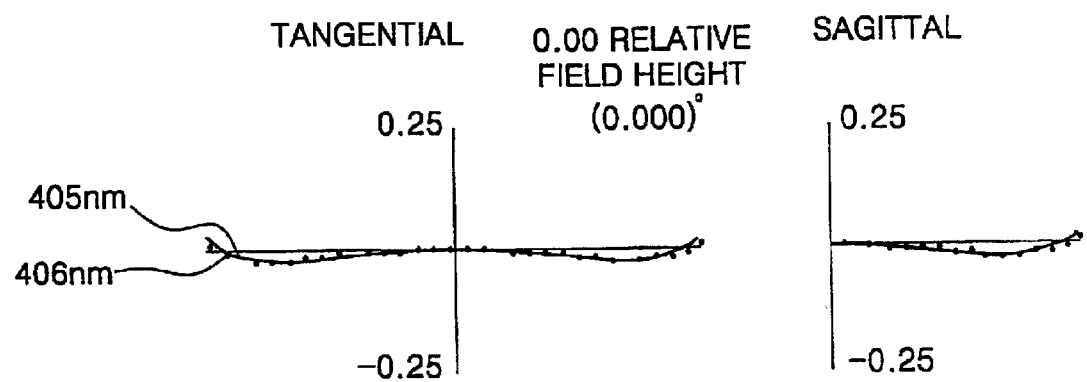
FIG. 14 is a view showing aberration of the objective lens device of FIG. 13.

Table 5 and FIG. 13 show the fourth optical design example of the objective lens device 10 according to the present invention. FIG. 14 shows aberration of the objective lens device 10 having optical data as shown in Table 5.

TABLE 5

| Surface | Radius of curvature (mm) | Thickness/ Interval (mm) | Material (glass) | Refractive index | Abbe number in line d |
|---|---|---|---|---|---|
| S41 | 3.017331 | 1.2000000 | E-BaCD12__HOYA | 1.599581 | 59.5 |
| S42 | −2.869224 | 0.500000 | E-FD8__HOYA | 1.729488 | 31.2 |
| S43 | ∞ | 1.872786 | | | |

TABLE 5-continued

| Surface | Radius of curvature (mm) | Thickness/ Interval (mm) | Material (glass) | Refractive index | Abbe number in line d |
|---|---|---|---|---|---|
| S44 (aspherical surface) | 0.888542 | 1.250000 | M-Lac130_HOYA | 1.715566 | 53.2 |
| | K: −0.654060 | | | | |
| | A: 0.895216E−01 B: 0.422347E−01 C: 0.559695E−01 D: 0.930347E−01 | | | | |
| | E: −.182547E+00 F:−.193469E−09 | | | | |
| S45 | ∞ | 0.100000 | | | |
| S46 | ∞ | 0.100000 | 'CG' | 1.621462 | 31.0 |
| S47 | ∞ | 0.000000 | | | |

As shown in Table 5, in the fourth optical design example of the objective lens device 10 according to the present invention, the second lens 13 having the negative power is formed of glass having an Abbe number which is 31.2. The focal distance of the second lens 13 is designed to be −3.933 mm.

As can be seen from FIG. 14, in the objective lens device 10 of the present invention having the optical data of Table 5, aberration is hardly generated even where the wavelength of light emitted from the light source 51 changes from the reference wavelength of 405 nm to 406 nm.

Given that the depth from the apex of the aspherical surface is Z, the equation for the aspherical surfaces S14, S24, S34 and S44 may be expressed by Equation 2.

$$Z = \frac{ch^2}{1+\sqrt{1-(1+K)c^2h^2}} + Ah^4 + Bh^6 + Ch^8 + Dh^{10} + Eh^{12} + Fh^{14} + Gh^{16} + Hh^{18} + Jh^{20} \quad \{\text{Equation 2}\}$$

In Tables 2 through 5 and Equation 2, K is a conic constant of the aspherical surfaces S14, S24, S34 and S44 of the third lens 15, and A, B, C, D, E, F, G, H, and J are aspherical surface coefficients. Also, h denotes the height from the optical axis and c denotes curvature. Aspherical surface coefficients E, F, G, and H which are not shown in one or more of Tables 2 through 5 are assumed to be zero in Equation 2 for the purpose of calculating Z based on the corresponding tabular data in Tables 2 through 5.

As can be seen from the above optical design examples, the objective lens device 10 according to the present invention corrects chromatic aberration with respect to blue light. Thus, where an optical pickup device for a recording medium of a next generation DVD series using a blue light source adopts the objective lens device 10 according to the present invention, superior recording and/or reproduction signals are obtained.

As described above, since the objective lens device according to the present invention is formed of three lenses including a lens having a negative power and formed of a material having an Abbe number which is 45 or less in line d and at least one of surfaces of the three lenses is formed of an aspherical surface, a high numerical aperture is realized and chromatic aberration with respect to blue light is correctable. Thus, by using the optical pickup employing the objective lens device according to the present invention, superior recording and/or reproduction are achieved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An objective lens device comprising three lenses wherein:

a first of the three lenses has a negative power and is formed of a material having an Abbe number which is 45 or less in line d;

at least one of the three lenses comprises an aspherical surface;

a numerical aperture of the objective lens device is 0.70 or more; and where a focal length of the first lens is $fn$ and an overall focal length of the objective lens device is $f$, the objective lens device satisfies the equation:

$$-2.4 < \frac{fn}{f} < -1.4.$$

2. The device as claimed in claim 1, wherein a second of the three lenses has a positive power and the first lens is combined with the second lens to be a doublet so that a structure of the objective lens device is formed in two groups of lenses.

3. The device as claimed in claim 2, wherein a third of the three lenses has a positive power and the first lens is disposed between the second and third lenses.

4. The device as claimed in claim 1, wherein the first lens is formed of glass or plastic.

5. The device as claimed in claim 4, wherein second and third lenses of the three lenses have a positive power and the first lens is disposed between the second and third lenses.

6. The device as claimed in claim 1, wherein:

second and third lenses of the three lenses have a positive power, and the first lens is disposed between the second and third lenses.

7. An optical pickup comprising:

a light source which emits light;

an objective lens device which focuses the light emitted from the light source into a light spot formed on a recording medium, the objective lens device comprising three lenses, wherein:

a first of the three lenses has a negative power and is formed of a material having an Abbe number which is 45 or less in line d, at least one surface of surfaces of the three lenses is aspherical, the objective lens device has a numerical aperture of 0.70 or more, and where a focal length of the first lens is $fn$ and an overall focal length of the objective lens device is $f$, the objective lens device satisfies the equation:

$$-2.4 < \frac{fn}{f} < -1.4;$$

an optical path changer which changes a proceeding path of incident light, the optical path changer arranged on an optical path between the light source and the objective lens device; and a photodetector which receives light reflected by the recording medium and via the objective lens device and the optical path changer.

8. The optical pickup as claim 7, wherein a second of the three lenses has a positive power and the first lens is combined with the second lens to be a doublet.

9. The optical pickup as claimed in claim 8, wherein a third of the three lenses has a positive power and the first lens is disposed between the second and third lenses.

10. The optical pickup as claimed in claim 7, wherein the light source emits light having a wavelength ($\lambda$) in a range of 400 nm$\leq\lambda\leq$420 nm.

11. The optical pickup as claimed in claim 10, wherein second and third lenses of the three lenses have a positive power and the first lens is disposed between the second and third lenses.

12. The optical pickup as claimed in claim 7, wherein the first lens is formed of glass or plastic.

13. The optical pickup as claimed in claim 12, wherein the second and third of the three lenses have a positive power and the first lens is disposed between the second and third lenses.

14. The optical pickup as claimed in claim 7, wherein second and third lenses of the three lenses have a positive power and the first lens is disposed between the second an third lenses.

15. The optical pickup as claimed in claim 14, wherein the aspherical surface is formed on one of the second and third lenses.

16. The optical pickup as claimed in claim 7, wherein the Abbe number of the first lens is formed of a material having an Abbe number ($A_N$) in line d in a range where 27.5$\leq A_N \leq$31.2.

17. The optical pickup as claimed in claim 7, wherein the Abbe number of the material of the first lens is 35 or less.

18. An optical pickup for recording information to and/or reproducing information from a recording medium, the optical pickup comprising:

a light source which emits light;

a photodetector; and an optical system which communicates the emitted light to the recording medium and communicates light reflected by the recording medium to the photodetector, the optical system comprising:

an objective lens device which forms the emitted light into a light spot on the recording medium, the objective lens device comprising first, second and third lenses, wherein:

the first lens has a negative power and is formed of a material having an Abbe number which is 45 or less in line d, the second and third lenses have a positive power, one of the second and third lenses is aspherical, the first lens is disposed between the second and third lenses on an optical path between the light source and the recording medium, the objective lens device has a numerical aperture of 0.70 or more, and where a focal length of the first lens is $fn$ and an overall focal length of the objective lens device is $f$, the objective lens device satisfies the equation:

$$-2.4 < \frac{fn}{f} < -1.4.$$

19. The optical pickup as claimed in claim 18, wherein the first lens and the second lens are arranged to form a doublet.

20. The optical pickup as claimed in claim 19, wherein the Abbe number ($A_N$) is in a range where 27.5$\leq A_N \leq$31.2.

21. The optical pickup as claimed in claim 18, wherein the Abbe number is in a range of 35 or less.

22. The optical pickup as claimed in claim 18, wherein the Abbe number ($A_N$) is in a range where 27.5$\leq A_N \leq$31.2.

23. The optical pickup as claimed in claim 18, wherein the light source emits light having a wavelength ($\lambda$) in a range of 400 nm$\leq\lambda\leq$420 nm.

24. An optical pickup for recording information to and/or reproducing information from a recording medium, the optical pickup comprising:

a light source which emits light having a wavelength ($\lambda$) in a range of 400 nm$\leq\lambda\leq$420 nm;

a photodetector; and an objective lens device which forms the emitted light as a spot on the recording medium and communicates light reflected by the recording medium toward the photodetector, the objective lens device comprising:

a first lens having a negative power and formed of a material having an Abbe number which is 45 or less in line d, a second lens having a positive power and forming a doublet with the first lens, and a third lens having a positive power, wherein:

one of the second and third lenses is aspherical, the objective lens device has a numerical aperture of 0.70 or more; and where a focal length of the first lens is $fn$ and an overall focal length of the objective lens device is $f$, the objective lens device satisfies the equation:

$$-2.4 < \frac{fn}{f} < -1.4.$$

* * * * *